Sept. 25, 1934.     H. C. HAYES     1,974,422
VIBRATION DETECTOR
Original Filed Sept. 23, 1927     2 Sheets-Sheet 1

HARVEY C. HAYES
INVENTOR

BY Robert A. Lavender
HIS ATTORNEY

Sept. 25, 1934. H. C. HAYES 1,974,422
VIBRATION DETECTOR
Original Filed Sept. 23, 1927 2 Sheets-Sheet 2

HARVEY C. HAYES
INVENTOR
BY
HIS ATTORNEY

Patented Sept. 25, 1934

1,974,422

UNITED STATES PATENT OFFICE 1,974,422

VIBRATION DETECTOR

Harvey C. Hayes, Washington, D. C.

Original application September 23, 1927, Serial No. 221,520. Divided and this application December 8, 1930, Serial No. 500,840

4 Claims. (Cl. 177—352)

(Granted under the act of March 3, 1883, as amended April 30, 1928; 370 O. G. 757)

This case is a division of my copending application covering Vibration detectors, Serial No. 221,520, filed September 23, 1927 and issued December 27, 1932 as Patent #1,892,147.

It has been a primary object of this invention to devise means for detecting vibrations which are produced in the surface of the earth either in the form of sound waves or of waves having a frequency outside of the range of audibility. An important feature of this invention is the construction of a device which is capable of picking up vibrations with equal facility over a wide range of direction. This is quite important where the precise direction from which the vibration emanates is not known and where it is desired to take note of the magnitude of the vibrations received.

While the device contemplated by the present invention is not limited to use in solid ground, but can be used for the reception of sound waves through water or directly through the air, it is particularly well suited for the reception of earth tremors and the like. One instance of the use to which the detector of the present invention can be put is for the reception of waves artificially set up in the ground, as by the explosion of a charge of dynamite, so that the character of the waves may be readily studied. It is well known that the amplitude and other characteristics of waves of this type vary materially with the nature of the media through which they have travelled and also in accordance with whether they are directly received or received after refraction or reflection.

An object of the invention has been to construct a device for the purposes specified in such a way that the mechanical energy of the sound or similar wave may readily be converted into electrical energy. This conversion, furthermore, has been brought about without sacrificing any of the inherent characteristics of the original wave so that the records produced by the electrical means will give an accurate indication of the nature of the original waves.

It has been an object to provide a very intimate contact between the device and the earth whose vibrations it is designed to detect. For this purpose the outer casing of the instrument has been formed in the shape of a cone having a gradual taper and being of sufficient dimension to insure its movement with the earth. To aid in providing this movement with the earth, furthermore, the casing has been constructed of suitable material and of appropriate thickness so that the device will have substantially the same average density and the same center of gravity as the earth into which it is inserted.

In the operation of the device which is based upon the general principles of magneto-electrical devices the casing is adapted to partake of the vibrations to be recorded while an inertia member within the casing remains substantially stationary. This provides the necessary relative movement between certain magnetic poles and adjacent magnetic conductors to create the desired variations in the flux passing through suitable coils located in the magnetic field. It is an object to so arrange the magnets and coils that the effects will be combined and will be substantially uniform over a wide range of direction of reception.

Another object of the invention has been to so construct and arrange the armature and its coils that a single device may, if desired, be employed not only to detect and give an indication of magnitude of the vibration but may at the same time indicate the direction of the source of the vibration.

With these and other incidental objects in view one form of the invention will now be described with reference to the accompanying drawings which form a part hereof and in which Figure 1 is a cross-sectional view in elevation of the assembled vibration detector.

Figure 1:
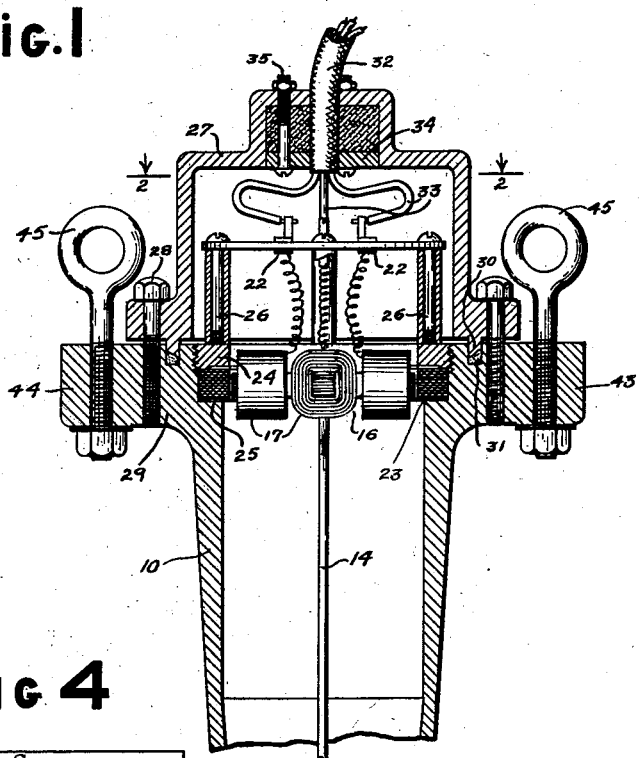

Referring now to Figure 1 it will be noted that the main body of the device is formed by a conical casing 10 of any suitable material, preferably such that with other parts, as will be explained, it will create a mass having an average density substantially the same as that normally encountered in surface soil. Aluminum has been found very satisfactory for this purpose. In practice it has been found desirable to make this casing of considerable length, approximately 30 inches over all, and the average thickness of the wall is preferably between ¼ and ½ inch. For a distance of a few inches from the lower tip of the cone it is substantially solid, except for an opening 11 which is drilled through this lower portion. Above the substantially solid part there is a large cavity or opening practically in the form of a frustrum of a cone which leaves only a wall of the desired thickness, such as mentioned. The cone preferably tapers from a relatively sharp point to an outside diameter in the neighborhood of five inches, while the opening is approximately three inches in diameter at the top.

In order to facilitate the insertion of the cone into the earth it is provided with a steel point 12 having a screw-threaded extension 13 adapted to be fitted into a screw-threaded opening at the lower end of the conical casing. The outer surface of the tip as shown is designed to form a smooth even contour with the lower end of the casing. If desired the tip may be locked into position when screwed into place by means of a countersunk set screw extending through the lower wall of the casing.

Figure 4:
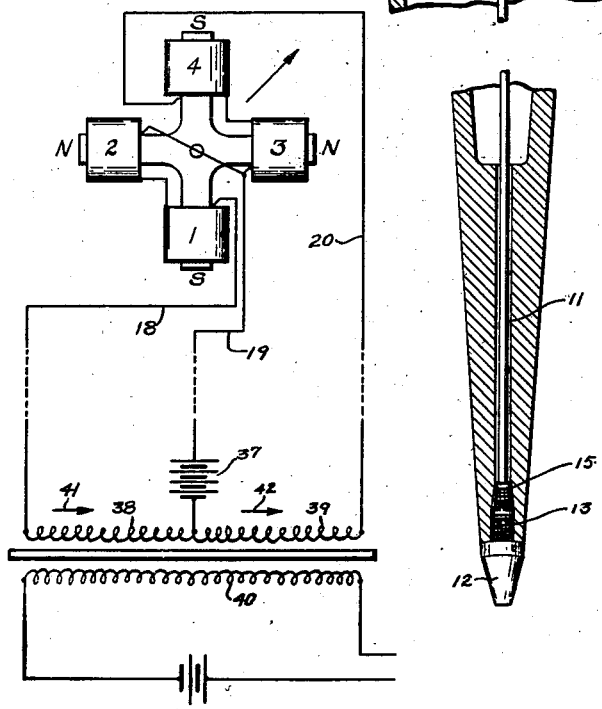
Figure 4 is a diagrammatic view of the circuits employed in the use of the device.
Figure 2:
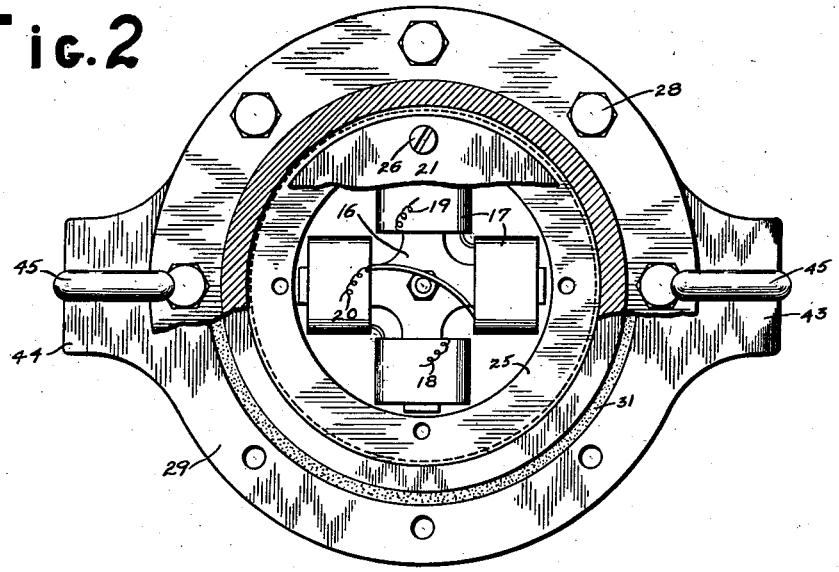
Figure 2 is a sectional view along the line 2—2 of Figure 1 with certain parts broken away to disclose others.

A resilient rod 14 of sufficient length to have a low natural frequency of vibration and made of any suitable material, preferably brass, carries a screw-threaded tip 15 which is also adapted to fit into a threaded portion at the lower end of the conical casing. The rod extends upwardly through the opening 11 and into the larger cavity of the cone at a point substantially at or near the upper surface of the cone. This rod is adapted to support an inertia member comprising an armature 16, which, as shown, is preferably formed as a cross to provide four separate pole pieces. The armature, which is preferably made of laminated steel such as is commonly used in transformers, may be secured in any way to the end of the rod, as by fitting it over the end of the rod onto a shoulder formed thereon and by holding it in place by a nut as shown. On each of the four poles of the armature there is mounted a coil 17 formed of a suitable number of turns of insulated wire, these coils being designated as 1, 2, 3 and 4 in Figures 3 and 4 of the drawings. The turns or windings of the coils are arranged in such sense about the armature poles that current passed through them from a D. C. source will tend to establish like magnetic poles at opposite ends of the cross, for example coils 1 and 4 may establish south poles, while coils 2 and 3 may establish north poles. Suitable connecting wires are employed to couple the coils, as shown in Figure 4. Thus coils 1 and 2 are connected in series by means of their outermost turns, while coils 3 and 4 are similarly connected. The inner ends of coils 2 and 3 are connected and suitable leads are taken off from the loose ends of coils 1 and 4 and from the inner end of the coil 2, these leads being designated 18, 19 and 20, respectively. Insulating plate 21 made of any suitable material, such as a phenolic condensation product, carries a set of three contact points 22 to which the several leads 18, 19 and 20 are connected.

Surrounding the armature there is provided an annular ring 23 made up of laminations similar to those employed in the armature itself. These may or may not be bound together, as desired, since they are squeezed tightly together by means of a locking ring 24 which forces them against a shoulder 25 at the upper end of the conical casing. The locking ring which is screw-threaded into the upper end of the casing is preferably made of some non-magnetic material, such as brass. It is quite essential that considerable accuracy be provided in the fitting of the armature within the annular ring. For this reason the inside of the ring is preferably ground accurately to the desired diameter and similarly the ends of the pole pieces are ground to form an accurate, arcuate face. Normally there will be a slight clearance between the ends of the pole pieces and the inner surface of the annular ring. In practice it has been found desirable to provide a clearance of about .006 of an inch between each pole piece and the ring. A series of screws 26 pass through collars of appropriate length which serve to support the previously mentioned insulating plate 21, the lower ends of these screws being fitted into threaded openings in the ring 24.

A cap 27, preferably formed of aluminum, is adapted to enclose the elements located at the upper end of the cone and is secured to the latter. For this purpose the cap is provided with a flange through which a series of bolts 28 pass into a corresponding flange 29 of the cone. An annular rib 30 formed on the lower surface of the cap and having its lower edge cut at an angle, as shown, is adapted to fit into an annular recess 31 in the upper end of the cone to provide a water-tight seal at this point. As an aid to the effectiveness of this seal the annular recess is preferably filled with some yielding material, such as rubber, to form a gasket. A small opening in the upper end of the cap is adapted to permit the passage of the cable 32 having three leads 33 which are connected to the contact points 22. In order to provide a water-tight connection surrounding the cable the latter fits as tightly as possible in the opening in the cap and there is also provided a stuffing box or gland construction in the upper portion of the cap. Thus a small reduced portion of the latter is closed off by a disc 34 which is supported from the top of the cap by a series of three bolts 35. The chamber thus provided may be filled with any suitable material, such as rubber.

In practice the device if used in solid ground must be inserted into the earth for the full length of the cone, which, as previously stated, may be about thirty inches. Since it would probably damage the instrument to attempt to force it directly into any very solid ground, it is contemplated that conical holes of substantially the right dimensions may first be formed by means of a prod bar, for example, so that the detector need only be forced for the last few inches of its length. In so forming the device it has been found to establish a very intimate contact with the surrounding soil whereby any vibration of the latter, in its packed condition, will be readily transmitted to the casing. The armature 16, however, due to its inertia will tend to remain stationary on the upper end of the rod 14 thereby tending to decrease the air gap between certain of the poles and the annular ring 23 and at the same time increase the air gap between one or more of the remaining poles and the ring. This variation in the air gaps will, of course, tend to vary the flux passing through the several coils and will tend to induce an E. M. F. in each of them.

In Figure 4 there is shown diagrammatically the connections which have been found most satisfactory in the use of the detector for the reception of earth vibrations. In this view 37 designates a D. C. source of current which is connected in parallel with the two pairs of coils, namely, 1 and 2 in one branch of the circuit and 3 and 4 in the other branch. The circuit through the coils 1 and 2 may be returned through the section 38 of the primary winding of a transformer, while the circuit through the coils 3 and 4 may be returned through a section 39 of the same primary winding. When the apparatus is at rest the current flowing through the coils and through the sections of the transformer will be constant so that no current will be induced in the secondary winding 40 of the transformer. However, when a relative movement is produced between the armature and the annular ring, for example in the direction indicated by the arrow, the flux through coils 1 and 2 will be decreased due to the enlargement of the air gap and a current will, therefore, be induced in these coils which will be in the same sense as the current from the source 37. This added current may pass through the coil 38 in the direction indicated by the arrow 41. At the same time the flux through the coils 3 and 4 will be increased and a current opposing that supplied by the source 37 will be induced and this current, therefore, or change in current will have the general direction in coil 39, as indicated by the arrow 42. Thus it will be seen that the two induced currents in the coils 1 and 2 and the coils 3 and 4, respectively, will be added in their effect in passing through the primary of the transformer, so that a current equal to the combined effect will be induced in the secondary winding 40. Any suitable means may be provided for creating a visible or audible indication of the current changes in the transformer.

A feature to be noted in connection with the generation of the induced current in the manner specified is that the precise direction from which the vibration is received is not material, the magnitude of the effect produced in the transformer will be substantially the same for a given magnitude of vibration over a wide range of direction from which it may be received. This is brought about by the fact that the currents induced in each coil of a pair will be added to the current induced in the other coil of the pair. Considering the coils 1 and 2, for example, a vibration received in a horizontal direction, as shown in Figure 4, will induce a maximum current in coil 2 and practically no current in coil 1. On the other hand a movement in the vertical direction, as shown in Figure 4, will induce a maximum current in coil 1 and little or no current in coil 2. If the vibration is received from any intermediate direction within the 90° range between the horizontal and vertical it will generate a current in both coils corresponding to the horizontal and vertical components of the motion and the two currents in the coils 1 and 2 will be added. There is only a single definite direction from which a vibration will have no effect upon the transformer. This is a vibration substantially at right angles to the arrow shown in Figure 4. It will be seen that a vibration in this direction, say toward the upper left hand corner of the drawings, will increase the flux in coil 2 and correspondingly decrease the flux in coil 1 so that the two E. M. F.'s induced will be opposed and presumably equal. Similarly the two E. M. F.'s induced in coils 3 and 4 will be opposed and presumably equal so that the net effect will be zero. For any other direction of vibration there will at least be an effect equal to the difference between the horizontal and vertical components and, as already pointed out, for any vibration within 45° of the direction indicated by the arrow the effect of the two components will be added rather than subtracted. If desired an arrow may be placed on the cap of the instrument to correspond to the arrow on the diagram indicating the quadrant of its greatest sensitivity. In practice then this arrow should preferably be pointed in the known or assumed direction of the source of the wave. Reflected or refracted waves which it may also be desired to detect will in all probability fall within 45° of either side of this direction.

After the device has been used to pick up the desired waves at a particular location the instrument may be pulled out of the ground. To aid in this operation the upper end of the cone is provided with a pair of ears 43 and 44 each of which is provided with an eye bolt 45. It will be found that due to the intimate contact of the cone with the earth considerable pulling will be required to remove the instrument. The turning of the cone by forcing against one or both of the ears will aid in loosening it or a crow bar may be inserted below one of the ears to pry it up. When once loosened the instrument may be readily raised by means of the eye bolts.

If the device is to be used for the reception of sound or similar waves through water it is merely necessary to suspend the instrument by means of the eye bolts in such a way as to completely immerse the device. The instrument is entirely water-proof so that there is no danger of affecting the operation in any detrimental way.

Figure 3:
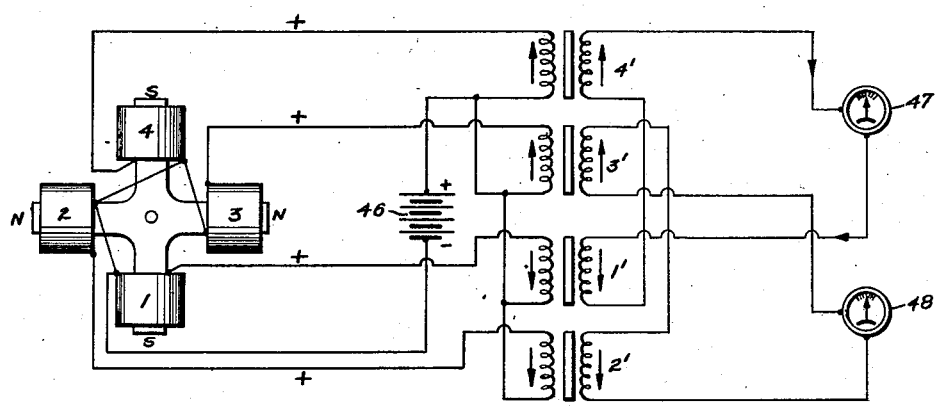
Figure 3 is a diagrammatic showing of suitable circuits for enabling the detector to determine the direction of the source of the vibration.

While one mode of using the present invention has been described in detail in the foregoing sections there are numerous possibilities for modification of various features for the accomplishment of somewhat different results. For example, it is possible to so connect the coils of the device already disclosed, with suitable transformers that not only the amplitude but the direction of a source of sound or similar waves may be determined. In order to accomplish this result it is merely necessary to appropriately combine the effects produced in coils 1 and 4 and simultaneously combine the effects produced in coils 2 and 3. By then producing separate indications as to the magnitude of the effects upon two groups of coils it is possible to determine the direction of the source. For this purpose each coil is preferably connected in series with the primary coil of a separate transformer and with a D. C. source of electricity; the latter may if desired, as shown in Figure 3, be common to all of the circuits through the transformers and coils. Thus the coil 4 may have one of its terminals connected to one end of the primary coil of a transformer 4', while the other end of this primary may be connected to the positive terminal of a battery 46. The negative terminal of the battery may then be connected to the other terminal of the coil 4. Similarly the remaining coils 3, 1 and 2 of the armature may be connected in series with the primary coils of transformers 3', 1' and 2', respectively, in the manner shown, care being taken to pass the current through the several coils in such direction as to establish the polarity indicated.

With this hook-up of coils and transformers it will be apparent that the movement of the armature cross in the direction of the arrow, indicated in Figure 4, will increase the flux through coils 3 and 4 so that currents will be induced therein to oppose this increase. A change in the current through the transformers 3' and 4' will therefore take place in the direction indicated by the arrows adjacent the primary coils of these transformers. On the other hand, the flux passing through coils 1 and 2 will be decreased so that an E. M. F. aiding that from the source 46 will be induced in each of these to oppose the decrease in flux and a change in current passing through the primary windings of the transformers 1' and 2' in the diction indicated by the arrows adjacent these findings will be brought about. The changes in current in all of the primary windings of the transformer will induce corresponding currents in the secondary windings of these transformers, as indicated by the arrows adjacent these windings. Now by appropriately connecting the coils 1' and 4' in series in such a way as to add the two induced currents flowing through them, a galvanometer 47 placed in the circuit may be made to give an indication in proportion to the change of flux through the coils 1 and 4. Similarly the secondary windings of transformers 2' and 3' may be connected in series so that their combined induced currents may be detected by a galvanometer 48 whose reading will be proportional to the change of flux through the coils 2 and 3. The readings of the two galvanometers 47 and 48, therefore, will serve to indicate the components of the vibration in the two directions along the co-ordinate axes formed by the center lines of the arms of the armature cross. Knowing these components it is obvious that the precise direction of the source of vibration may readily be determined. It is assumed, of course, that as between two directions 180° apart the general direction of the source will be known.

In connection with the form of the invention, as hereinabove described, it is highly desirable to attain as nearly as possible the condition in which the casing and all of the parts which move directly therewith, form a mass not only having an average density equal to that of the displaced soil but one whose center of gravity is the same as that of the soil displaced. It will be apparent that the more nearly this condition is approached the more accurately the vibrations of the surrounding earth will be reproduced. Furthermore, it is desirable that the average density for each increment of length shall be substantially the same. Thus, for example, it is preferable, although it is practically impossible to carry it out precisely, to have the center of gravity of each horizontal section of the device of say an inch in height in coincidence with the center of gravity of the soil which occupied the same space. Adherence as closely as possible to this condition will avoid much of the distortion in the vibrations of the casing which would otherwise result.

While an admirable form or embodiment of the present invention has been disclosed in detail in the foregoing sections, it will be understood that many other changes may be made within the contemplation of the invention and which will fall within the scope of the claims which follow.

The invention described herein may be manufactured and used by or for the Government of the United States of America for governmental purposes without the payment to me of any royalty thereon.

What I claim is:

1. In a vibration detector a ring of magnetic material, an armature mounted within and in the plane of said ring and having poles at right angles to each other spaced slightly from said ring, coils mounted on said poles, means for supporting said ring and armature and adapted to permit relative bodily movement thereof in any direction in said plane in response to vibrations to be detected and means cooperating with said armature and said coils for indicating the relative magnitude of components along the axes of adjacent poles of vibrations received.

2. In a vibration detector a ring of magnetic material, an armature mounted within and in the plane of said ring and having poles at right angles to each other and normally spaced equal distances from said ring, coils mounted on said poles, means for supporting said ring and armature and adapted to permit relative bodily movement thereof in all directions in the plane of said ring in response to vibrations to be detected, and means cooperating with said armature and said coils for indicating the relative magnitude of components along the axes of adjacent poles of vibrations received, said indicating means comprising a plurality of transformers, the primary windings of which are connected individually in series with each of said coils and a D. C. source of electricity, and the secondaries of those transformers the primaries of which are connected to alternate coils being connected in series in pairs, each of said pairs being connected with a current measuring device.

3. In a vibration detector a ring of magnetic material, an armature mounted within and in the plane of said ring and having poles at right angles to each other spaced slightly from said ring, coils mounted on said poles, means for electrically energizing said coils so as to produce a magnetic flux between said poles and said ring, means for supporting said ring and said armature and adapted to permit relative bodily movement of said ring and said armature in any direction in the plane of said ring, and means cooperating with said armature and said coils for indicating the components in the directions of the axes of adjacent coils of a vibration affecting the detector and causing relative movement between said armature and said ring.

4. A vibration detector including an inertia member, a second member, means mounting one member on the other so as to permit relative movement between the members in any direction in a plane and electro-magnetic means actuated by movement of said members for generating electric currents proportional to the components of movements of said members in two directions at right angles to each other, and indicating means responsive to said currents for indicating the component movements in two directions along coordinate axes corresponding to the components of said movements at right angles to each other.

HARVEY C. HAYES.